United States Patent [19]
Heilgeist et al.

[11] Patent Number: 4,741,810
[45] Date of Patent: May 3, 1988

[54] PROCESS FOR REDUCTIVE PLUTONIUM STRIPPING FROM AN ORGANIC REPROCESSING SOLUTION INTO AN AQUEOUS, NITRIC ACID SOLUTION BY USE OF AN ELECTROLYTIC CURRENT

[75] Inventors: Michael Heilgeist, Linkenheim; Helmut Schmieder, Karlsruhe; Klaus Flory, Bad Bergzabern, all of Fed. Rep. of Germany

[73] Assignee: Kernforschugszentrum Karlsruhe GmbH, Karlsruhe, Fed. Rep. of Germany

[21] Appl. No.: 681,739

[22] Filed: Dec. 14, 1984

[30] Foreign Application Priority Data

Dec. 14, 1983 [DE] Fed. Rep. of Germany ....... 3345199

[51] Int. Cl.$^4$ .......................... C25B 1/00; C01G 56/00
[52] U.S. Cl. .......................................... 204/1.5; 423/8; 423/10; 423/251
[58] Field of Search ...................... 204/1.5; 423/8, 20, 423/251

[56] References Cited
U.S. PATENT DOCUMENTS

| | | | |
|---|---|---|---|
| 3,616,276 | 10/1971 | Schneider et al. | 204/1.5 |
| 3,730,851 | 5/1973 | Schwind et al. | 204/1.5 |
| 3,770,612 | 11/1973 | Gray et al. | 204/1.5 |
| 3,869,374 | 3/1975 | Golblacker et al. | 204/1.5 |
| 3,957,615 | 5/1976 | Diefenbacher et al. | 204/1.5 |
| 4,341,602 | 7/1982 | Nenner et al. | 204/1.5 |

FOREIGN PATENT DOCUMENTS 1905519  2/1969  Fed. Rep. of Germany .

OTHER PUBLICATIONS

Kelmers et al., *Energy Research Abstracts*, 4 (#3), p. 679, Abs. #6380 (Feb. 15, 1979).
"Nitrogen", *Atlas of Electrochemical Equilibria in Aqueous Solutions*, Marcel Pourbaix et al, pp. 493 to 503.

Primary Examiner—Edward A. Miller
Attorney, Agent, or Firm—Sughrue, Mion, Zinn, Macpeak, and Seas

[57] ABSTRACT

A process for reductive plutonium stripping from an organic reprocessing solution into an aqueous, nitric solution by use of an electrolytic current, in which the aqueous solution is free of agents for the stabilization of the reduced valence of the plutonium, a $HNO_3$ concentration in the range of 0.05 to 1.0 mol/l is established in the aqueous solution, and the reduction of Pu(IV) to Pu(III) is carried out at a maximum temperature of 40° C.

1 Claim, No Drawings

PROCESS FOR REDUCTIVE PLUTONIUM STRIPPING FROM AN ORGANIC REPROCESSING SOLUTION INTO AN AQUEOUS, NITRIC ACID SOLUTION BY USE OF AN ELECTROLYTIC CURRENT

BACKGROUND OF THE INVENTION

The present invention relates to a process for reductive plutonium stripping from an organic reprocessing solution into an aqueous, nitric acid solution by use of an electrolytic current.

In particular, the present invention relates to a process for the separation of plutonium out of an organic phase, which is developed in the recovery of irradiated nuclear fuel and/or fertile material. In the recovery process, irradiated nuclear fuel and/or fertile material is dissolved in an aqueous, strong acid to form an aqueous phase or starting solution (feed solution) containing, among other things, uranium ions, and plutonium ions. The uranium and plutonium ions are then transferred from the aqueous phase into an organic reprocessing solution (organic phase) comprised of an organic extraction agent, such as tributyl phosphate (TBP), dissolved in a diluent. This transfer of uranium and plutonium to the organic phase is known as coextraction. The plutonium is present in this organic phase in its 4+ valence state. The organic phase is then treated to selectively strip the plutonium from the organic reprocessing solution to an aqueous solution by reducing the plutonium to its 3+ valence state.

A process for the reductive stripping of plutonium from an organic extraction solution into an aqueous, nitric acid solution by use of an electrolytic current was suggested in German Patentschrift No. 19 05 519 for the separation of the fissionable materials uranium and plutonium which are present in an organic solution which was developed in the recovery of irradiated nuclear fuel- and/or fertile materials. In this process, the fissionable material uranium remained in the organic reprocessing solution, in contrast with the fissionable material plutonium, which was present in the organic solution in its fourth valence states, was reduced to the third valence state and transferred on the basis of the solubility relationship into the aqueous phase. This phase is a diluted aqueous phase which contains nitric acid, and nitrous acid which is also always present in such a diluted nitric acid containing aqueous phase. This nitrous acid is in a position to reoxidize Pu(III), and accordingly hydrazine was used as a stabilization agent for Pu(III) in the aqueous stripping solution. Hydrazine or hydrazine nitrate, respectively, prevents the reoxidation of Pu(III) by reacting with the nitrous acid faster than Pu(III) reacts with the nitrous acid. The reaction rate for the Pu(III)-HNO$_2$ reaction depends on the acid concentration. The reaction proceeds quickly and autocatalytically at the usual acid concentrations of 0.8 to 1 mol/l HNO$_3$.

Indeed, based on the knowledge that below a certain nitric acid concentration the nitrous acid no longer has an oxidizing, but rather a reducing effect on the Pu(IV)-Pu(III) pair, which could be deduced from the Potential-pH-Diagrams for the HNO$_3$/HNO$_2$/NO$_x$/Pu system (Pourbaix-Diagrams, M. Pourbaix, Atlas of Electrochemical Equilibria, Pergamon Press, 1966), it was attempted to introduce nitrous acid or nitric oxide as the reduction agent in the plutonium-uranium-reduction-extraction process (PUREX Process) in the aqueous reductive stripping solution and thus avoid the addition of a Pu(III) stabilization agent. Difficulties, however, arose with this technical process. The redox characteristics of the HNO$_2$/Pu system are not only dependent on pH, but also dependent on concentration. On the one hand, one must try to attain a high nitrite concentration, for example 0.01 to 1 mol/l, while on the other hand a low acid concentration down to 0.1 mol/l HNO$_3$ must be guaranteed in order to attain sufficiently high reduction rates. Moreover, the organic phase has an extracting effect on HNO$_2$. Finally, additional problems can arise as a result of polymer formation of Pu(IV) in low acid concentrations.

Because of these technical process difficulties, preference is given to electrolytic reduction of plutonium and its stripping from the organic phase into the aqueous phase, in which a stabilization agent for Pu(III), as for example hydrazine, must be contained. Such an aqueous stripping phase can comprise, for example, a diluted nitric acid with about 0.6 mol/l HNO$_3$, which contains about 0.2 mol/l hydrazine, as disclosed in German Patentschrift No. 19 05 519. Subsequent to this stripping, the stabilization agent must, however again be destroyed, in order to be able to supply the aqueous, plutonium-containing solution for further processing. Moreover, for the continuous production of the aqueous stripping solution, hydrazine must be taken from storage, which presents technical safety problems particularly in nulear plants.

SUMMARY OF THE INVENTION

A primary object of the present invention is to simplify and improve reductive plutonium stripping from an organic reprocessing solution into the aqueous phase.

A further object of the present invention is to provide such a process which permits the elimination of the previously required addition of a Pu(III) stabilization agent to the extraction system, before the electrochemical plutonium reduction, as for example hydrazine or hydrazine nitrate, respectively, so that on the one hand destruction of the stabilization agent subsequent to the extraction in the aqueous phase and on the other hand storage of the stabilization agent before its use are no longer required.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for reductive stripping of plutonium from an organic reprocessing solution into an aqueous, nitric acid solution by use of an electrolytic current comprising (a) providing as the aqueous solution one which is free from agents for the stabilization of the reduced valence of plutonium, Pu(III), (b) establishing an HNO$_3$ concentration in the range of 0.05 to 1.0 mol/l in the aqueous solution, and (c) carrying out the reduction of Pu(IV) to Pu(III) at a maximum temperature of 40° C.

The reduction of plutonium is preferably carried out at a current density in the range of 0.5 to 20 mA/cm$^2$.

It is to be understood that both the foregoing general description and the following detailed description are exemplary and explanatory, but are not restrictive of the invention.

DETAILED DESCRIPTION OF THE INVENTION

The present invention is more thoroughly explained in the following on the basis of a few sample experiments for the reduction of plutonium in an aqueous solution, and on the basis of an example for the execution of the process according to the present invention in an electrolytically operated countercurrent extraction column under working conditions.

The sample experiments were all carried out with aqueous nitric acid electrolytes, which each contained 20 g/l uranyl nitrate and 5 g/l Pu(IV) nitrate. These concentration ratios of U and Pu correspond to those in the first cycle of the PUREX process. The apparatus comprised a titanium cylinder, which simultaneously served as cathode, with an covered (PTFE) floor and 4 cm diameter, and a platinized tantalum rod, centered, as anode. The cathode surface was 100 cm$^2$, the anode surface was 5 cm$^2$, and the electrolyte volume was 100 cm$^3$.

To carry out the experiment, the solution to be reduced was in every case added to the titanium container and after switching on the current, the potential course and the concentrations of U(VI, IV), Pu(III, IV, VI) follow as a function of time.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

This example illustrates the acid dependence of the plutonium reduction.

Electrolyte solutions with different HNO$_3$ concentrations, and specifically with 0.3 mol/l, 0.4 mol/l, 0.5 mol/l and 0.7 mol/l, were electrolyzed at a temperature of 20° C. with a current density $j = 1$ mA/cm$^2$, e.g. with a total of I=100 mA.

At the conditions given here, all Pu(IV) present in the solution was reduced within one hour to Pu(III) in the solutions which had HNO$_3$ concentrations of 0.3 mol/l, 0.4 mol/l and 0.5 mol/l. The reduction of Pu was not complete in the solution which had 0.7 mol/l HNO$_3$.

In the electrolyte solutions with 0.3 and 0.4 mol/l HNO$_3$, the third valence state of Pu that had been achieved remained stable over the entire duration of the experiment (3 hours). This means that in these solutions, a reoxidation of the plutonium was prevented, so an addition of, for example, hydrazine was no longer required.

The electrolyte solution which contained 0.5 mol/l HNO$_3$ indeed showed a Pu(III) stability, after reaching complete reduction, for a duration of about 1½ hours of the experiment, after which the stability, however, was no longer maintained, and Pu(III) was at this low current density of 1 mA/cm$^2$ partially again reoxidized. An HNO$_3$ concentration of 0.5 mol/l in the electrolytes would however still be usable, if the duration of the aqueous phase in the extraction apparatus were correspondingly short.

EXAMPLE 2

This example illustrates the dependence of the plutonium reduction on the current density or potential of the cathode, respectively.

An electrode solution with a HNO$_3$ concentration of 0.3 mol/l was electrolyzed at a temperature of 20° C. at the following current densities: $j = 0.5$ mA/cm$^2$, 1 mA/cm$^2$, 2 mA/cm$^2$ and 5 mA/cm$^2$.

The cathode potential at the beginning of the experiment was in each case determined to be as shown in the following Table 1.

TABLE 1

| Current Density (mA/cm$^2$) | 0.5 | 1 | 2 | 5 |
|---|---|---|---|---|
| Cathode Potential (mV) | −104 | −192 | −227 | −308 |

The plutonium reduction was complete with the current densities 1, 2 and 5 mA/cm$^2$, in each case after about 1 hour, and remained stable over the duration of the experiment up to about 3 hours. The reduction at the current density of 0.5 mA/cm$^2$ was at first complete, but did not remain stable very long.

Under the same experimental conditions, an electrolyte solution containing 0.7 mol/l HNO$_3$ was also treated. The cathode potential at the beginning of the experiment in each case was determined to be as shown in the following Table 2.

TABLE 2

| Current Density (mA/cm$^2$) | 0.5 | 1 | 2 | 5 |
|---|---|---|---|---|
| Cathode Potential (mV) | −91 | −228 | −237 | −273 |

By the selection of higher current densities, in this case of 2 and 5 mA/cm$^2$, a complete plutonium reduction is also achieved at an acid concentration of 0.7 mol/l. The third valence state of the plutonium remains stable at a current density of 5 mA/cm$^2$ over the duration of the experiment of 3 hours, and at a current density of 2 mA/cm$^2$ only over half of this duration. These experimental conditions as well are an example of the usefulness of the process according to the present invention for corresponding durations of the aqueous phase in the extraction apparatus.

EXAMPLE 3

This example illustrates the temperature dependence of the plutonium reduction.

The electrolyte solutions contained 0.4 mol/l HNO$_3$ and were electrolyzed at a current density of $j = 1$ mA/cm$^2$. Different temperatures were used, namely 20° C., 25° C., 30° C., 40° C. and 50° C.

The plutonium reduction remained stable at 20° C. At 25° C., a complete plutonium reduction was achieved, yet after 1½ hours a partial reoxidation of the Pu(III) occured. Also at 30° C. an almost complete plutonium reduction was at first achieved, which however no longer remained stable at the conditions of the experiment presented here.

EXAMPLE 4

This example compares the conventional process which uses hydrazine (a) with the process according to the present invention which is carried out without hydrazine (b):

(a) Conventional Process Employing Hydrazine

In a countercurrent extraction column operated electrolytically, an aqueous phase with 0.10 mol/l HNO$_3$ and 0.10 mol/l $N_2H_5NO_3$ was supplied with a flow of 6 l/h. In countercurrent, an organic phase of a 30% TBP/dodecane solution with the following concentrations U=81 g/l
Pu=0.9 g/l
H+=0.2 mol/l was supplied with a flow of 24 l/h. The reductive extraction was carried out at a temperature of 26° C. with a current I=35 A, and a current density of j=1.1 mA/cm². The phases leaving the column show the following concentration ratios:

Organic phase:
U=67.5 g/l
Pu=about 2 mg/l
H+=0.02 mol/l

Aqueous phase:
U=54 g/l
Pu=3.6 g/l
H+=0.82 mol/l.

(a) Process According to the Present Invention (Without Hydrazine)

To the same column as employed in (a) above, there was supplied an aqueous phase containing 0.10 mol/l $HNO_3$ with a flow of 6 l/h, and an organic phase of a 30% TBP/dodecane solution containing 0.10 mol/l $HNO_3$, 94 g/l U, 0.75 g/l Pu with a flow of 24 l/h. The working temperature was between 24° and 28° C., the current was 44 A, and the current density was j=1.1 mA/cm². The phases leaving the column show the following concentration ratios:

Organic phase:
0.02 mol/l $HNO_3$
77 g/l U
about 2 mg/l Pu

Aqueous phase:
0.42 mol/l $HNO_3$
68 g/l U
3.0 g/l Pu

This example shows that the process according to the present invention can be successfully used in recovery processes.

It will be understood that the above description of the present invention is susceptible to various modifications, changes and adaptations, and the same are intended to be comprehended within the meaning and range of equivalents of the appended claims.

What is claimed is:

1. Process for reductive stripping of plutonium from an organic reprocessing solution in which the plutonium is present as Pu(IV) into an aqueous, nitric acid solution by use of an electrolytic current, comprising:
    (a) providing as the aqueous solution one which is free of agents for stabilizing the reduced valence of the plutonium, Pu(III),
    (b) establishing an $HNO_3$ concentration in the range of 0.05 to 1.0 mol/l in the aqueous solution and
    (c) carrying out the reduction of Pu(IV) to Pu(III) at a maximum temperature of 40° C., and at a current density in the range of 0.5 to 20 mA/cm².

* * * * *